United States Patent
Brown et al.

(10) Patent No.: US 6,282,230 B1
(45) Date of Patent: Aug. 28, 2001

(54) BLOCK PSEUDO-NOISE GENERATING CIRCUIT

(75) Inventors: Katherine G. Brown, Coppell; Zhengou Gu, Plano, both of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/404,082

(22) Filed: Sep. 23, 1999

(51) Int. Cl.[7] .................... H04B 15/00; H04K 1/00; H04L 27/30
(52) U.S. Cl. .......................... 375/140; 714/252
(58) Field of Search .................. 375/130; 708/250, 708/252; 380/46; 714/739; 331/78

(56) References Cited

U.S. PATENT DOCUMENTS

| | | | |
|---|---|---|---|
| 5,228,054 | * 7/1993 | Rueth et al. | 708/252 |
| 5,758,104 | * 5/1998 | Gujral et al. | 710/107 |
| 5,926,070 | * 7/1999 | Barron et al. | 331/78 |

* cited by examiner

*Primary Examiner*—Chi Pham
*Assistant Examiner*—Phuong Phu
(74) *Attorney, Agent, or Firm*—Dwight N. Holmbo; Wade James Brady, III; Frederick J. Telecky, Jr.

(57) ABSTRACT

An LFRS (40, 50) calculates a PN sequence using Fibonacci form, such that when an offset is calculated from a known state, the bits of the new state comprise a block of sequence bits. Accordingly, to calculate a block having a length less than the length of the LFSR (40), all bits of the desired block can be calculated in a single offset calculation. If the block has a length greater than the length of the LFSR, one or more additional masks can be used to calculate the additional bits of the block sequence. Zero insertion is also supported.

8 Claims, 2 Drawing Sheets

BLOCK PSEUDO-NOISE GENERATING CIRCUIT

CROSS REFERENCE TO RELATED APPLICATIONS

This application is related to U.S. Ser. No. 09/222,454, entitled "State Calculation Circuit for Discrete Linear State Space Model" to Gu, assigned to TEXAS INSTRUMENTS INCORPORATED of Dallas, Tex., filed Dec. 29, 1998, which is incorporated by reference herein.

STATEMENT OF FEDERALLY SPONSORED RESEARCH OR DEVELOPMENT

Not Applicable

BACKGROUND OF THE INVENTION

1. Technical Field

This invention relates in general to code division multiple access (CDMA) communications systems and, more particularly, to a state generator circuit for generating a block of pseudo-noise chips having an arbitrary offset from an initial state.

2. Description of the Related Art

Present code division multiple access (CDMA) systems are characterized by simultaneous transmission of different data signals over a common channel by assigning each signal a unique code. This unique code is matched with a code of a selected receiver to determine the proper recipient of a data signal. Base stations in adjacent cells or transmit areas also have a unique pseudorandom noise (PN) code associated with transmitted data. This PN code is typically generated by a linear feedback shift register (LFSR), also known as a linear sequence shift register (LSSR), and enables mobile stations with the cell to distinguish between intended signals and interference signals from other base stations. Identification of a PN code requires that the mobile station correctly identify an arbitrary part of the received PN sequence. The identification is frequently accomplished by a correlation of a locally generated PN sequence with the PN sequence received from the base station. The sliding window algorithm often requires the mobile station to efficiently calculate multiple offsets from the LFSR to match the received sequence.

FIG. 1 illustrates a four-stage LFSR 10; in most applications, a much larger circuit, for example, a 40-stage LFSR, would be used to generate the pseudo-noise sequence. In the illustrated embodiment, a clock signal is used to clock delay flip-flops 12, 14, 16 and 18. The output, q1, of stage 12 is coupled to an input of exclusive-or gate 20, along with the output, q4, of flip-flop 18. The output of exclusive-or gate 20 is connected to the input of flip-flop 14. The output, q2, of flip-flop 14 is coupled to the input of flip-flop 16. The output, q3, of flip-flop 16 is coupled to the input of flip-flop 18. The output of flip-flop 18 is the PN signal.

Table 1 illustrates the sequence of bits in the LFSR 10, starting from an arbitrary initial state of "1100".

TABLE 1

| | LFSR States | | | |
|---|---|---|---|---|
| State | q1 | q2 | Q3 | q4 |
| 1 | 1 | 1 | 0 | 0 |
| 2 | 0 | 1 | 1 | 0 |
| 3 | 0 | 0 | 1 | 1 |
| 4 | 1 | 1 | 0 | 1 |
| 5 | 1 | 0 | 1 | 0 |
| 6 | 0 | 1 | 0 | 1 |
| 7 | 1 | 1 | 1 | 0 |
| 8 | 0 | 1 | 1 | 1 |
| 9 | 1 | 1 | 1 | 1 |
| 10 | 1 | 0 | 1 | 1 |
| 11 | 1 | 0 | 0 | 1 |
| 12 | 1 | 0 | 0 | 0 |
| 13 | 0 | 1 | 0 | 0 |
| 14 | 0 | 0 | 1 | 0 |
| 15 | 0 | 0 | 0 | 1 |
| 1 | 1 | 1 | 0 | 0 |

Accordingly, the output of the circuit 10, assuming an initial state of "1100" is "001101011110001 . . . " which will repeat indefinitely. The PN sequence will vary depend upon which of the intermediate outputs (q1–q3) is connected to an exclusive-or gate 20 along with the output of the LFSR (q4). For example, if q2 and q4 were coupled to the exclusive-or gate 20, the output sequence would change. The output PN sequence of a 40-stage LFSR would repeat every $2^{40}-1$ bits (or "chips"). In some cases, a "0" is inserted into the sequence in order to produce an even $2^{40}$ bit sequence.

As stated above, it is often useful to shift a known number of bits in a PN sequence, for example, in a sliding window algorithm. U.S. Pat. No. 5,228,054 to Rueth et al, which is incorporated by reference herein, illustrates an arbitrary offset circuit for an LFSR using a mask circuit in combination with a w-bit LFSR. The mask circuit produces the desired offset in response to a mask signal. A particular problem with generation of the mask signal concerns the number of masks which would be needed in an implementation of a larger LFSR. The storage needed for the masks would create problems in many devices, such as mobile handsets, where power conservation is extremely important.

Therefore, a need has arisen for a high-speed method and apparatus for generating in offset in a PN sequence.

BRIEF SUMMARY OF THE INVENTION

In the present invention, a block of sequence bits within a pseudo-noise sequence is defined using by a desired location of a block with a pseudo-noise sequence. A known state vector is multiplied by a matrix corresponding to the offset between said known state vector and said desired location to generate an offset state vector in Fibonnaci form. A plurality of sequential bits are obtained from said offset state vector which define the block of pseudo-noise bits.

The present invention provides significant advantages over the prior art. First, after a single matrix multiplication, an entire block of sequence bits can be generated without further calculations or shifts, insofar as the block length is equal to or less than the length of the LFSR. Second, if the length of the block is less than the length of the LFSR, the offset calculation can be performed to allow shifting of the block without further calculations. Third, if the block length is greater than the length of the LFSR, the extra bits can easily be generated using one or more predetermined masks.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention is best understood in relation to FIGS. 1–5 of the drawings, like numerals being used for like elements of the various drawings.

Figure 1:
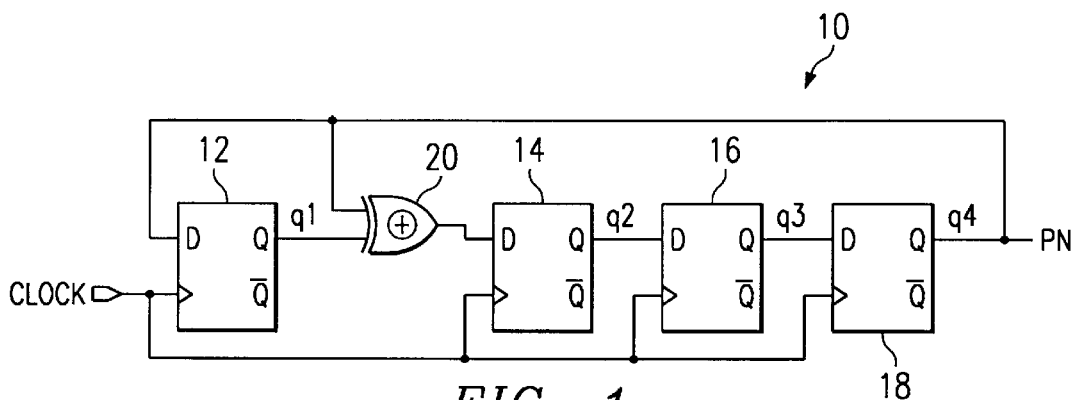
FIG. 1 illustrates a prior art 4-stage LFSR in a Galois structure.

Referring to FIG. 1, the equations representing the outputs of each flip-flop 12–18 are:

$$q1[n+1]=q4[n]$$

$$q2[n+1]=q1[n] \oplus q4[n]$$

$$q3[n+1]=q2[n]$$

$$q4[n+1]=q3[n]$$

where $\oplus$ designates an exclusive-or operation or, equivalently, modulo two addition.

These equations can be placed into state transition matrix form:

$$s[n+1]=T\,s[n]$$

or $$\begin{bmatrix} q1[n+1] \\ q2[n+1] \\ q3[n+1] \\ q4[n+1] \end{bmatrix} = \begin{bmatrix} 0001 \\ 1001 \\ 0100 \\ 0010 \end{bmatrix} \begin{bmatrix} q1[n] \\ q2[n] \\ q3[n] \\ q4[n] \end{bmatrix}$$

Alternatively, T could be written as $$\begin{bmatrix} 0 & 1 \\ I & C \end{bmatrix},$$

where $0=[000]$, I=

$$I = \begin{bmatrix} 100 \\ 010 \\ 001 \end{bmatrix}$$

and $$C = \begin{bmatrix} 1 \\ 0 \\ 0 \end{bmatrix},$$

where I is the identity matrix, $0$ is the zero vector and C is the exclusive-or connection vector. The connection vector identifies whether the input to a stage is coupled directly to the output of the previous stage, or to an exclusive-or of the output of the previous stage and the output of the last stage. If, for example, an additional exclusive-or gate was placed between flip-flops 14 and 16, receiving q2 and q4 as inputs, with the output of the exclusive-or connected to the input of flip-flop 14, the connection vector would be $$C = \begin{bmatrix} 1 \\ 1 \\ 0 \end{bmatrix}.$$

An offset can be calculated using repeated application of the T matrix. Using the state calculations described above, $s[n+2]=T(T\,s[n])$, $s[n+3]=T(T(T\,s[n]))$, and so on. Thus, to move j states ahead in time from a starting state $s[n]$, $s[n+j]=T^j\,s[n]$). An efficient method of calculating $T^j$ is provided in U.S. Pat. No. 09/222,454 to Gu, entitled "State Calculation Circuit for Discrete Linear State Space Model", filed Dec. 29, 1998, assigned to TEXAS INSTRUMENTS INCORPORATED, which is incorporated by reference herein.

Using the Galois structure shown in FIG. 1, a block of PN sequence bits can be produced by generating an offset from the current state to the start of the block, preferably using the method shown in U.S. Pat. No. 09/222,454, cited above. The offset, however, will only provide the first bit of the PN sequence in the block. Additional bits can be produced by subsequent applications of the T matrix. Each application of the T matrix will render an additional bit. Accordingly, to generate a block of 30 bits, the T matrix will be applied 30 times. The total time required for generating the block will thus be equal to the time needed to generate the offset plus the time to apply the T matrix 30 times. Alternatively, one or more masks of the type described in connection with U.S. Pat. No. 5,228,054 to Rueth et al, cited above, may be applied to generate additional bits.

Figure 2:
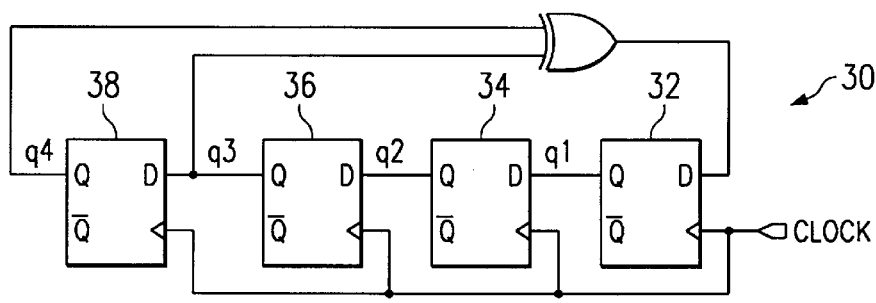
FIG. 2 illustrates an LFSR, with the same output sequence as FIG. 1, in a Fibonnaci structure.

FIG. 2 illustrates a block diagram of a LFSR circuit 30 in Fibonnaci form, which has the same PN sequence output as the Galois LFSR circuit of FIG. 1. To aid in understanding, circuit 30 is shown with the main flow of bits through the circuit from right to left, as opposed to the left to right flow of FIG. 1. In the circuit of FIG. 2, a clock signal is used to clock delay flip-flops 32, 34, 36 and 38. The output, q1, of stage 32 is coupled to the input of flip-flop 34. The output, q2, of flip-flop 34 is coupled to the input of flip-flop 36. The output, q3, of flip-flop 36 is coupled to the input of flip-flop 38. The output of flip-flop 38 is coupled to the input of exclusive-or gate 40. The output of exclusive-or gate 40 is coupled to the input of flip-flop 32. The output of flip-flop 38 is the PN signal.

Table 2 shows the states of the LFSR 30, once again beginning at the arbitrary state "0110."

TABLE 2

Fibonacci LFSR States

| State | q1 | q2 | q3 | q4 |
|---|---|---|---|---|
| 1 | 1 | 0 | 0 | 0 |
| 2 | 0 | 1 | 0 | 0 |
| 3 | 0 | 0 | 1 | 0 |
| 4 | 1 | 0 | 0 | 1 |
| 5 | 1 | 1 | 0 | 0 |
| 6 | 0 | 1 | 1 | 0 |
| 7 | 1 | 0 | 1 | 1 |
| 8 | 0 | 1 | 0 | 1 |
| 9 | 1 | 0 | 1 | 0 |
| 10 | 1 | 1 | 0 | 1 |
| 11 | 1 | 1 | 1 | 0 |
| 12 | 1 | 1 | 1 | 1 |
| 13 | 0 | 1 | 1 | 1 |
| 14 | 0 | 0 | 1 | 1 |
| 15 | 0 | 0 | 0 | 1 |
| 1 | 1 | 0 | 0 | 0 |

As can be seen from Table 2, the fifteen bit repeating PN sequence (i.e., the q4 output) from LFSR 30 is also "001101011110001 . . . " (beginning at state 5). As in the case of the Galois circuit of FIG. 1, the PN sequence can be varied depending upon which of the intermediate outputs (q1–q3) are connected to the exclusive-or gate 40.

To translate a Galois LFSR to a Fibonacci LFSR, the direction of flow through the flip-flops is reversed, and the exclusive-or terms are brought to a common gate, which adds the exclusive-or terms using modulo-2 arithmetic.

Referring to FIG. 1, the equations for the outputs of each flip-flop 12–18 are:

$$q1[n+1]=q3[n]\oplus q4[n]$$

$$q2[n+1]=q1[n]$$

$$q3[n+1]=q2[n]$$

$$q4[n+1]=q3[n]$$

where $\oplus$ designates an exclusive-or operation or, equivalently, modulo two addition.

These equations can be placed into state transition matrix form:

$$s[n+1]=F\ s[n]$$

or $$\begin{bmatrix} q1[n+1] \\ q2[n+1] \\ q3[n+1] \\ q4[n+1] \end{bmatrix} = \begin{bmatrix} 0011 \\ 1000 \\ 0100 \\ 0010 \end{bmatrix} \begin{bmatrix} q1[n] \\ q2[n] \\ q3[n] \\ q4[n] \end{bmatrix}$$

Alternatively, F could be written as $$\begin{bmatrix} (flip(C))^T & 1 \\ I & 0^T \end{bmatrix},$$

where $$0^T = \begin{bmatrix} 0 \\ 0 \\ 0 \end{bmatrix},$$

$$I = \begin{bmatrix} 100 \\ 010 \\ 001 \end{bmatrix}$$

and flip$(C)^T$=[0 0 1], where I is the identity matrix, 0 is the zero vector and C is the exclusive-or connection vector described in connection with FIG. 1. In this case, the connection vector identifies which intermediate outputs are coupled to the common exclusive-or gate 40. If, for example, output q2 was coupled to the common exclusive-or gate 40, the connection vector would be C=[0 1 1].

As in the case for the Galois form, an offset can be calculated using repeated application of the F matrix. Using the state calculations described above, s[n+2]=F (F s[n]), s[n+3]=F (F (F s[n])), and so on. Thus, to move j states ahead in time from a starting state s[n], s[n+j]=$F^j$ s[n]). The method of calculating the offset in U.S. Pat. No. 09/222,454 could thus be used to efficiently calculate an offset for the Fibonacci form shown in FIG. 2 as well as the Galois form shown in FIG. 1.

An advantage to using an LFSR in Fibonacci form, as shown in FIG. 2, is that multiplication of the current state by the F matrix also generates the entire block of PN sequence bits without further calculation, assuming that the length of the LFSR is greater than the number of bits in the block. Using the LFSR 30 of FIG. 2 as an example, it can be seen that the next three bits to be output are stored in flip-flops 36, 34 and 32, respectively. Since the output of each flip-flop flows through the LFSR without modification, the vector s[n+j] provides a sequence of subsequent output bits, the length of the sequence being equal to the length of the s[n+j] vector. Accordingly, a block of PN sequence bits can be obtained from the state vector s of the LFSR.

The speed improvement by using an LFSR in the Fibonacci form shown in FIG. 2 may be significant, particularly for large block lengths. In a LFSR with 40 flip-flops and a desired block size of 30 bits, use of the Fibonacci form would allow reading of all 30 PN sequence bits immediately after calculating the offset. With a Galois structure, an additional 29 shifts through the LFSR would be necessary to determine all 30 bits in the block.

Figure 3:
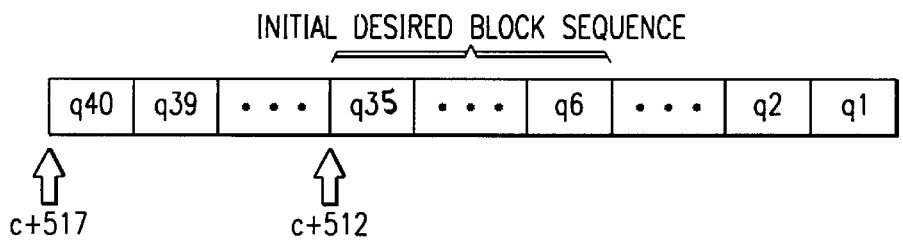
FIG. 3 illustrates use of additional bits provided by the LFSR of FIG. 2 in order to allow fast shifting of the block sequence.

In the preferred embodiment, assuming that the length of the state vector s is greater than the length of the desired block, the offset is calculated, such that the block lies between the extremes of the bits, as shown in FIG. 3. For example, assuming a LFSR having a shift register comprised of 40 flip-flops, a desired block sequence of 30 bits and a desired offset of 512 bits from the current output of the LFSR, an offset of 517 (512+(40−30)/2) bits may be calculated. The desired block sequence would thus be available at the q6–q35 outputs of the flip-flops of the LFSR or, alternatively, at bits 35 through 6 of the state vector after multiplication by the F matrix (i.e., $s_{35..6}$[n+517]. By calculating the offset to obtain the block sequence bits from the intermediate flip-flops, overlapping sequences in either direction from the initial block sequence can be obtained without any further calculations or operations. While the description above provides for placing the block in the center of the generated bits, the block could be calculated to any desirable position intermediate to the extremes of the bits generated by the LFSR.

The circuitry for performing the matrix calculation $F^j$ s[n] is shown in U.S. Ser. No. 09/222,454 referenced above. In addition to calculating the PN sequence starting at an arbitrary offset from any given state, the matrix calculation circuitry can act as a shift register type LFSR by multiplying s[n] by $F^1$ (i.e., incrementing by an offset of a single state). Accordingly, the matrix calculation circuitry acts as an LFSR, operable to generate a PN sequence of arbitrary length.

Figure 4:
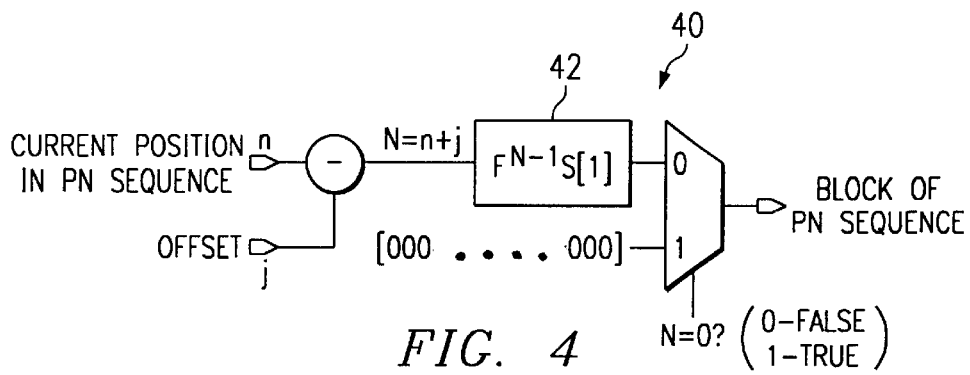
FIG. 4 illustrates an embodiment of the invention for calculating sequence block with lengths less than the length of the LFSR.

FIG. 4 illustrates a block diagram of an implementation of the system used to accommodate sequences using zero insertion, such as CDMA IS-95. In this implementation, for a w-bit LFSR, a zero is inserted in the sequence to produce a $2^w$ PN sequence. By convention, the "0" is inserted just subsequent to a state of all "0" followed by a PN sequence bit of "1". This state is designated as s[0]. Table 3 illustrates an adaptation of the sequence of Table 2, with zero insertion supported.

TABLE 3

| | Fibonacci LFSR States with Zero Insertion | | | |
|---|---|---|---|---|
| State | q1 | q2 | q3 | q4 |
| 0 | 0 | 0 | 0 | 0 |
| 1 | 1 | 0 | 0 | 0 |
| 2 | 0 | 1 | 0 | 0 |
| 3 | 0 | 0 | 1 | 0 |
| 4 | 1 | 0 | 0 | 1 |
| 5 | 1 | 1 | 0 | 0 |
| 6 | 0 | 1 | 1 | 0 |
| 7 | 1 | 0 | 1 | 1 |
| 8 | 0 | 1 | 0 | 1 |
| 9 | 1 | 0 | 1 | 0 |
| 10 | 1 | 1 | 0 | 1 |
| 11 | 1 | 1 | 1 | 0 |
| 12 | 1 | 1 | 1 | 1 |
| 13 | 0 | 1 | 1 | 1 |
| 14 | 0 | 0 | 1 | 1 |
| 15 | 0 | 0 | 0 | 1 |
| 0 | 0 | 0 | 0 | 0 |
| 1 | 1 | 0 | 0 | 0 |

Hence, the output sequence is "0011010111100001 . . . " starting at state 5.

In FIG. 4, an embodiment of an LFSR 40 is shown where the current position in the sequence, n, is combined with the desired offset j, to generate an absolute address N=n+j (is N>$2^w$−1, then N=N−$2^w$). A matrix calculation circuit 42 calculates the state at the offset is equal to $F^{N-1}$s[1] (alternatively, the state at the offset could be calculated as $F^j$ s[n]). The output of the matrix calculation circuit 42 is input to the multiplexer 44, along with the s[0] state. If N=0, the s[0] state is passed to the output for determining the desired block; if N<>0, then the output of the matrix calculation circuit is passed to the output.

The circuit of FIG. 4 works well where the desired block sequence is less than or equal to the length of the LFSR. In cases where the desired block sequence is greater than the length of the LFSR, the circuit of FIG. 5 can be used.

Figure 5:
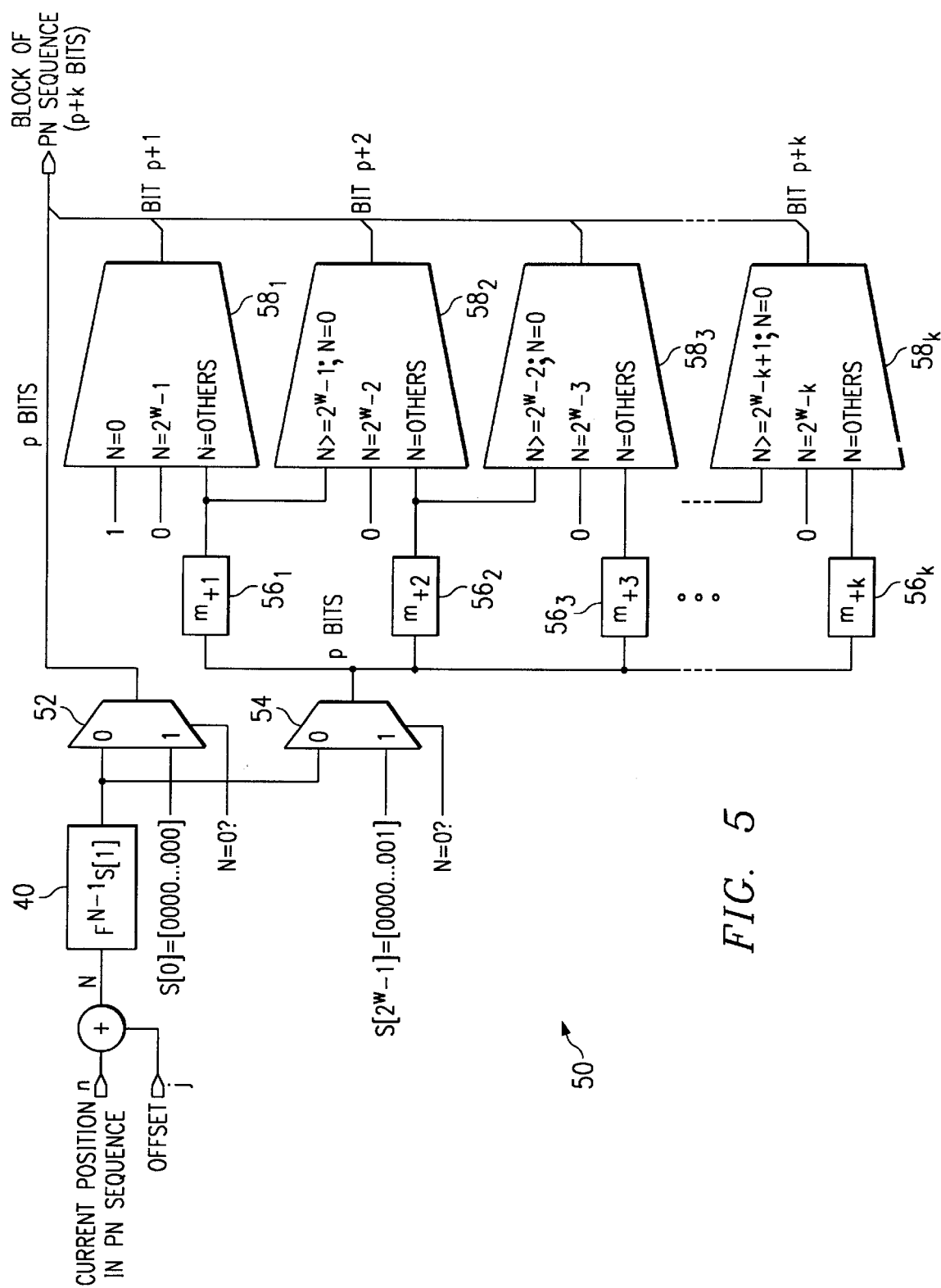
FIG. 5 illustrates an embodiment of the invention for calculating sequence block with lengths greater than the length of the LFSR.

FIG. 5 illustrates a block diagram of an implementation of the system used to accommodate sequences using zero insertion, where the desired block sequence is greater than the length of the LFSR. The LFSR 50 of FIG. 5 uses a matrix calculation circuit 40 similar to that shown in FIG. 4. In the preferred embodiment, the matrix calculation circuit multiplies s[1] by $F^{N-1}$, where N=n+j (i.e., the current position in the sequence plus the desired offset). The output of matrix calculation circuit 40 is a p-bit block sequence. In normal circumstances, p=w (the length of the LFSR). If the desired block length is larger than p, the remaining k bits are provided by additional circuitry.

The output of matrix calculation circuit 40 is coupled to the input of multiplexer 52. The other input to multiplexer 52 is the s[0] vector. The output of multiplexer 52 is the first p bits of the block. The output of matrix calculation circuit 40 is also coupled to an input to multiplexer 54 along with vector s[$2^w$−1], the vector which precedes the s[0] vector in the PN sequence. The output of multiplexer 54 is input to k masks 56, individually referenced as masks $56_1$ through $56_k$. The output of each multiplexer $56_1$ through $56_k$ is coupled to an input of a respective multiplexer 58 (individually referenced as $58_1$ through $58_k$). Multiplexer $58_1$ has two additional inputs of "1" and "0", while the remaining multiplexers have two additional inputs: (1) the output of the previous mask 56 (i.e., the output of mask $56_1$ is coupled to the input of multiplexer $58_2$) and (2) a "0" input. The outputs of multiplexers 58 comprise the additional k bits for the block to be combined with the p bits from the matrix calculation circuit 40.

Multiplexers 52 and 54 are controlled by an N=0 input. If N=0, the multiplexers 52 and 54 pass the output of the matrix calculation circuit 40; otherwise, multiplexer 52 passes the s[0] vector and multiplexer 54 passes the s[$2^w$−1] vector. Masks 56 multiply the vector received from multiplexer 54 by a respective vector, each of which calculates an additional bit. The masks can be of the type described in connection with U.S. Pat. No. 5,228,054 to Rueth et al, cited above. Mask $56_1$ multiplies the vector from multiplexer 54 by vector $m_{+1}$ (which generates the first additional bit), mask $56_2$ multiplies the vector from multiplexer 54 by vector $m_{+2}$ (which generates the second additional bit), mask $56_3$ multiplies the vector from multiplexer 54 by vector $m_{+3}$ (which generates the third additional bit), and mask $56_k$ multiplies the vector from multiplexer 54 by vector $m_{+k}$ (which generates the $k^{th}$ additional bit). As described above, these masks are producing the next k bits in the sequence, either from the output of the matrix calculation circuit 40 or from the s[$2^w$−1] vector.

Multiplexers $58_1$ through $58_k$ operate to detect three conditions: (1) the normal condition where the additional bit provided by the multiplexer would be the next bit in the shift register, (2) the zero insertion case, where a "0" needs to be inserted at that bit position and (3) if a preceding multiplexer was the zero insertion case. In operation, each multiplexer $58_1$ through $58_k$ determines whether it is the zero insertion case. If so, a "0" is output. If it is not a zero case, it determines whether any of the preceding multiplexers 58 was a zero insertion case. If so, the output of the preceding mask is taken to accommodate extra bit provided by the upstream zero insertion. If neither of those cases applies, the "normal" sequence bit is output (i.e., the output of the matrix calculation circuit 40 times the respective mask 56).

For example, if N=0, then multiplexers 58 output bits associated with s[1] through s[k]. As can be seen in FIG. 5, multiplexer $58_1$ outputs a "1" (s[1] will always generate a PN sequence output of "1"), while multiplexer $58_2$ through $58_k$ output the s[$2^w$−1] vector multiplied by the respective mask. If N=$2^w$−1, then multiplexer $58_1$ will perform the zero insertion. Accordingly, multiplexer $58_1$ outputs a "0", and multiplexers $58_2$ through $58_k$ pass the output from the preceding mask—multiplexer $58_2$ outputs the bit associated with s[1] (i.e., F s[$2^w$−1]), multiplexer $58_3$ outputs the bit associated with s[2] (i.e., $F^2$ s[$2^w$−1]), and so on. If N=$2^w$−2, then multiplexer $58_1$ outputs the normal case (i.e., the bit associated with the output of the matrix calculation circuit 40 multiplied by F) and multiplexer $58_2$ will perform zero insertion. Accordingly, multiplexer $58_2$ outputs a "0", multiplexer $58_3$ outputs the bit associated with s[1] (i.e., F s[$2^w-1$], the output of the preceding mask $56_2$), multiplexer $58_k$ outputs the bit associated with s[k-1] (i.e., $F^{k-1}$ s[$2^w-1$], the output of mask $56_{k-1}$).

The masks $m_{+1}, m_{+2}, m_{+3}, \ldots m_{+k}$, can be easily derived. Masks $m_0$ is defined as the mask which provides the last bit of a 1xp vector, $m_0$=[00 . . . 001]. The LFSR 40 calculates $F^{N-1}$s[1]. The first additional bit in the sequence would equal $m_0F(F^{N-1}s[1])$. Hence $m_{+1}=m_0F^1$. The same analysis can be used to show that in the general case $m_{+k}=m_0F^k$ The present invention provides significant advantages over the prior art. First, after a single matrix multiplication, an entire block of sequence bits can be generated without further calculations or shifts, insofar as the block length is equal to or less than the length of the LFSR. Second, if the length of the block is less than the length of the LFSR, the offset calculation can be performed to allow shifting of the block without further calculations. Third, if the block length is greater than the length of the LFSR, the extra bits can easily be generated using one or more predetermined masks.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

What is claimed is:

1. A method of generating a block of sequence bits in a pesudo-noise sequence comprising the steps of:

receiving information defining a desired location of the block within the pseudo-noise sequence;

multiplying a known state vector by a matrix corresponding to the offset between said known state vector and said desired location to generate an offset state vector in Fibonnaci form;

obtaining a plurality of sequential bits that are intermediate bits in said offset state vector to define said block of pseudo-noise bits;

applying one or more masks to said offset state vector to generate respective additional bits in said block of pseudo-noise bits;

for each mask, detecting whether the corresponding additional bit in the sequence is an inserted bit of a predetermined value based upon its position in the sequence; and for each mask, detecting whether a previous additional bit is an inserted bit of said predetermined value.

2. The method of claim 1 and further comprising the step of, for each mask, inserting a bit of said predetermined value upon detection that the corresponding additional bit in the sequence is an inserted bit of said predetermined value.

3. The method of claim 2 and further comprising the step of, for each mask, inserting a bit generated by a previous mask upon detection that the a previous additional bit in the sequence is an inserted bit of said predetermined value.

4. The method of claim 3 and further comprising the step of inserting a bit from the corresponding mask if there is no detection that the corresponding additional bit in the sequence is an inserted bit of said predetermined value and there is no detection that the a previous additional bit in the sequence is an inserted bit of said predetermined value.

5. The method of claim 1 wherein said step of determining whether the additional bit is an inserted bit of a predetermined value comprised whether the additional bit is inserted "0".

6. Circuitry for generating a block of sequence bits in a pseudo-noise sequence, comprising:

a circuitry for receiving information defining a desired location of the block within the pseudo-noise sequence;

a circuitry for multiplying a known state vector by a matrix corresponding to the offset between said known state vector and said desired location to generate an offset state vector in Fibonnaci form;

a circuitry for defining a plurality of sequential bits in said offset state vector as the block;

at least one mask applied to said offset state vector to generate respective additional bits in said block of pseudo-noise bits; and a circuitry for passing a bit of a predetermined value coupled to respective masks, responsive to whether the corresponding additional bit in the sequence is an inserted bit of a predetermined value based upon its position in the sequence.

7. The circuitry of claim 6 and further comprising circuitry for passing a bit from a previous mask responsive to whether a previous additional bit is an inserted bit of said predetermined value.

8. The circuitry of claim 7 and further comprising circuitry for passing a bit from a corresponding mask responsive to no detection that the corresponding additional bit in the sequence is an inserted bit of said predetermined value and to no detection that the a previous additional bit in the sequence is an inserted bit of said predetermined value.

* * * * *